(No Model.)
T. J. PERRIN.
TELEPHONE.
No. 316,818.  Patented Apr. 28, 1885.
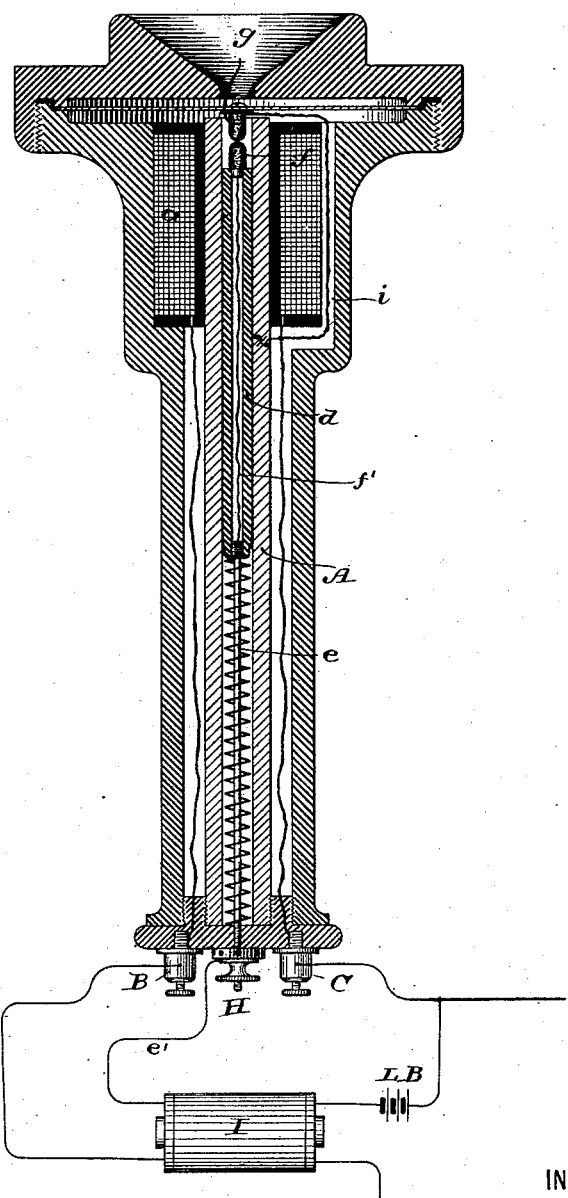
WITNESSES
Wm A. Skinkle
Henry A. Lamb
INVENTOR
Thomas J. Perrin.
By his Attorneys
Baldwin, Hopkins & Payton

UNITED STATES PATENT OFFICE.

THOMAS J. PERRIN, OF NEW YORK, N. Y., ASSIGNOR, BY MESNE ASSIGNMENTS, TO THE NATIONAL IMPROVED TELEPHONE COMPANY, OF NEW ORLEANS, LOUISIANA.

TELEPHONE.

SPECIFICATION forming part of Letters Patent No. 316,818, dated April 28, 1885.

Application filed February 20, 1884. (No model.)

*To all whom it may concern:*

Be it known that I, THOMAS J. PERRIN, of the city, county, and State of New York, have invented certain new and useful Improvements in Telephones, of which the following is a specification.

The object of my invention is to improve the organization of reacting telephones or combined contact-transmitters and magneto-receivers.

The accompanying drawing is a longitudinal section through my improved instrument with the circuits shown in diagram.

The instrument represented is in form like the well-known Bell receiver. The magnet A is tubular, and is provided with an ordinary helix, a. The main line enters at the binding-post C, traverses the helix a, and passes out of the instrument at the binding-post B. These elements, with the diaphragm, constitute a speaking-telephone receiver. The magnet A is hollow, however, and within it is placed a section, d, of rubber tubing, or, indeed, any elastic material which is preferably either insulated or is itself a non-conductor. This section of material carries on its end, near its diaphragm, a suitable contact-button of carbon, f, or other proper material, which is electrically connected, as shown, by a wire, f', through the metallic rod e, which supports and adjusts the section of elastic material d with the binding-post H. The rod e is surrounded with a suitable coil-spring, which normally presses the button f toward the diaphragm, and the position of the button is adjusted by a thumb-nut on the threaded extension of the rod. A suitable button or electrode, g, shown as insulated, but which may, of course, be uninsulated, is carried upon the diaphragm and rests in contact with the button f. As the diaphragm vibrates in response to the magnetic conditions of the core A, variations of pressure corresponding to the vibrations of the diaphragm will occur between the electrodes or contacts g f. If, therefore, these contacts be included in a primary transmitting-circuit, the received message may be relayed or thrown upon a main line, as is well understood. In the drawings, however, a branch circuit, i, is shown as taken from the main line at the point x before it enters the helix a, and is connected with the electrode g. This branch circuit is continued through the electrode f and rod e to the binding-post H; thence by wire e' through the primary of an induction-coil, I, to the local battery LB, the opposite pole of which is connected with the binding-post C. There is therefore a primary transmitting-circuit running from the local battery LB to the binding-post C; thence by the main line to the point x, and by the branch circuit i, electrodes, rod e, and line e', through the primary of the induction-coil to the opposite pole of the battery. The main line from the binding-post B is connected through the secondary of the induction-coil I to ground. When a message is received from the main line, the diaphragm, vibrating in response to variations of current, causes corresponding changes of contact between the electrodes. These changes affect the primary circuit, which react on the main line and produce an intensified effect in the receiver.

I claim as my invention—

1. The combination, substantially as set forth, of the casing, the diaphragm, the tubular magnet, its helix, a transmitting-electrode, g, carried by the diaphragm, a tube of rubber, d, arranged within the tubular magnet, the other electrode, f, mounted on the end of said tube, the rod e, to which the tube d is connected, the spiral spring around said rod, the adjusting-nut on the end of the rod, and the electric connection f', which extends through the tube d and connects the rod e and the electrode f.

2. The combination, substantially as set forth, of the diaphragm, the magnet, its helix, the main line in which the helix is included, the electrode g, the opposite electrode f, the branch i of the main line in which said electrodes are included, the primary of the induction-coil in which said branch is included, and the secondary line of said induction-coil.

In testimony whereof I have hereunto subscribed my name this 14th day of February, A. D. 1884.

THOS. J. PERRIN.

Witnesses:
E. H. QUANTIN,
J. CHARLES KUTZ.